United States Patent
Sun et al.

(10) Patent No.: US 9,285,517 B2
(45) Date of Patent: Mar. 15, 2016

(54) BACK COVER FOR BACKLIGHT SOURCE, BACKLIGHT SOURCE, AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Lingyu Sun, Beijing (CN); Hongli Zhu, Beijing (CN); Xiuyun Chen, Beijing (CN); Dae Keun Yoon, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 35 days.

(21) Appl. No.: 14/104,014

(22) Filed: Dec. 12, 2013

(65) Prior Publication Data
US 2014/0169032 A1 Jun. 19, 2014

(30) Foreign Application Priority Data
Dec. 14, 2012 (CN) .......................... 2012 1 0544433

(51) Int. Cl.
*F21V 7/09* (2006.01)
*G02B 5/10* (2006.01)
(Continued)

(52) U.S. Cl.
CPC ............ *G02B 5/10* (2013.01); *G02F 1/133615* (2013.01); *F21V 7/0025* (2013.01); *F21V 7/09* (2013.01); *G02B 6/0055* (2013.01); *G02B 6/0061* (2013.01); *G02B 6/0096* (2013.01)

(58) Field of Classification Search
CPC ..... F21V 7/0025; F21V 7/0033; F21V 7/005; F21V 7/0066; F21V 7/0083; F21V 7/04; F21V 7/09; G02B 5/10; G02B 6/0055; G02F 1/1336

USPC .................. 362/241, 243, 247, 297, 298, 346
See application file for complete search history.

(56) References Cited

U.S. PATENT DOCUMENTS

| 8,235,540 B2* | 8/2012 | Park et al. ..................... 362/97.1 |
| 8,926,128 B2* | 1/2015 | Park .................. G02F 1/133615 362/247 |
| 2004/0114343 A1 | 6/2004 | Ho |

FOREIGN PATENT DOCUMENTS

| CN | 102518992 A | 6/2012 |
| CN | 202382107 U | 8/2012 |

(Continued)

OTHER PUBLICATIONS

Chinese Search Report dated Dec. 17, 2013 (2 pages).
(Continued)

*Primary Examiner* — Y M Lee
(74) *Attorney, Agent, or Firm* — Harness, Dickey & Pierce, P.L.C.

(57) ABSTRACT

The present invention provides a back cover for a backlight source, a backlight source and a display apparatus. The back cover includes at least one reflection surface arranged on one surface of the back cover. The reflection surface includes a first reflection region and a second reflection region, each of which includes a plurality of concave arc-shaped regions. The concave arc-shaped regions of the first reflection region have curvature increasing toward the second reflection region, and the concave arc-shaped regions of the second reflection region have curvatures decreasing in a direction away from the first reflection region. The concave arc-shaped region having a maximum curvature in the first reflection region is connected with the concave arc-shaped region having a maximum curvature in the second reflection region.

20 Claims, 2 Drawing Sheets

(51) Int. Cl.
*G02F 1/1335* (2006.01)
*F21V 7/00* (2006.01)
*F21V 8/00* (2006.01)

(56) References Cited

FOREIGN PATENT DOCUMENTS

CN 202432359 U 9/2012
CN 202972973 U 6/2013

OTHER PUBLICATIONS

Office Action from Chinese counterpart application CN201210544433.4 issued by The State Intellectual Property Office of China (SIPO) dated Dec. 26, 2013. English Translation provided by Dragon Intellectual Property Law Firm.

Second Office Action from Chinese counterpart application CN2012105444334 issued by The State Intellectual Property Office of China (SIPO) dated Aug. 1, 2014 with English translation provided by Dragon Intellectual Property Law Firm.

Chinese Office Action regarding Application No. 2012105444334 dated Aug. 1, 2014. Translation provided by Dragon Intellecual Property Law Firm.

Third Office Action from Chinese counterpart application CN2012105444334 issued by The State Intellectual Property Office of China (SIPO) dated Dec. 22, 2014 with English translation provided by Dragon Intellectual Property Law Firm.

* cited by examiner

BACK COVER FOR BACKLIGHT SOURCE, BACKLIGHT SOURCE, AND DISPLAY APPARATUS

CROSS REFERENCE

The present application claims a priority of the Chinese patent application No. 201210544433.4 filed on Dec. 14, 2012, which is incorporated herein by reference in its entirety.

BACKGROUND OF THE INVENTION

1. Field of the Invention

The present invention relates to the display field, particularly relates to a back cover for a backlight source, a backlight source, and a display apparatus.

2. Description of the Prior Art

A liquid crystal display (LCD) apparatus is light, thin, and has a low power consumption. Thus, LCD apparatus is widely used in modern information facilities. An LCD panel of the LCD apparatus does not have a light-emitting characteristic, and displays an image by receiving enough uniformly-distributed light from a backlight source. Thus, a performance of the backlight source affects a quality of the LCD apparatus directly. Recently, with an increase in brightness and a decrease in thickness of LCD apparatus, the backlight source is required to have low cost, low power consumption, high brightness and required to be ultra-slim and be environment-friendly.

In a current backlight source, a light guide plate (LGP) is a necessary component to uniformly guide the light, which is emitted from the light source, to a display panel. However, the light guide plate has a high cost, and various defects easily occur to the light guide plate causing an adverse effect to a normal operation of the light guide plate.

SUMMARY OF THE INVENTION

The object of the present invention is to provide a display technology in order to avoid a use of a high-cost light guide plate in a backlight source and to avoid an occurrence of defects caused by the use of the light guide plate.

To achieve the above object, aspects of the present invention will be described as the following.

According to a first aspect of the present invention, a back cover for a backlight source includes at least one reflection surface that is arranged on one surface of the back cover. The reflection surface includes a first reflection region and a second reflection region. The first reflection region includes a plurality of concave arc-shaped regions whose curvatures increase in a direction toward the second reflection region. The second reflection region includes a plurality of concave arc-shaped regions whose curvatures decrease in a direction away from the first reflection region. The concave arc-shaped region having a maximum curvature in the first reflection region is connected with the concave arc-shaped region having a maximum curvature in the second reflection region.

In the above back cover, the first reflection region includes a first concave arc-shaped region having a curvature within a range of 0.004 to 0.007 $mm^{-1}$, a second concave arc-shaped region having a curvature within a range of 0.008 to 0.011 $mm^{-1}$, and a third concave arc-shaped region having a curvature within a range of 0.03 to 0.06 $mm^{-1}$. The second reflection region includes a fourth concave arc-shaped region having a curvature within a range of 0.008 to 0.01 $mm^{-1}$, a fifth concave arc-shaped region having a curvature within a range of 0.005 to 0.007 $mm^{-1}$, a sixth concave arc-shaped region having a curvature within a range of 0.002 to 0.004 $mm^{-1}$, and a seventh concave arc-shaped region having a curvature within a range of 0.0006 to 0.001 $mm^{-1}$.

In the above back cover, the first concave arc-shaped region has a central angle $\alpha 1$ within a range of 2 to 4 degrees, the second concave arc-shaped region has a central angle $\alpha 2$ within a range of 5 to 8 degrees, the third concave arc-shaped region has a central angle $\alpha 3$ within a range of 7 to 9 degrees, the fourth concave arc-shaped region has a central angle $\alpha 4$ within a range of 8 to 11 degrees, the fifth concave arc-shaped region has a central angle $\alpha 5$ within a range of 3 to 5 degrees, the sixth concave arc-shaped region has a central angle $\alpha 6$ within a range of 3 to 6 degrees, and the seventh concave arc-shaped region has a central angle $\alpha 7$ within a range of 2 to 4 degrees.

In the above back cover, the reflection surface further includes a third reflection region. The third reflection region includes an eighth concave arc-shaped region having a curvature within a range of 0.001 to 0.004 $mm^{-1}$ and a ninth concave arc-shaped region having a curvature within a range of 0.001 to 0.003 $mm^{-1}$. The eighth concave arc-shaped region is connected with the seventh concave arc-shaped region.

In the above back cover, the eighth concave arc-shaped region has a central angle $\alpha 8$ within a range of 2 to 4 degrees, and the ninth concave arc-shaped region has a central angle $\alpha 9$ within a range of 1 to 3 degrees.

In the above back cover, the reflection surface further includes a convex arc-shaped region. The convex arc-shaped region is connected with the ninth concave arc-shaped region. The convex arc-shaped region has a curvature within a range of 0.004 to 0.007 $mm^{-1}$ and a central range $\alpha 10$ within a range of 4 to 7 degrees.

Further, the back plate includes two pieces of the reflection surface which are axial-symmetrically arranged and referred to as a first reflection surface and a second reflection surface respectively.

In the above back cover, the convex arc-shaped region of the first reflection region is connected with the convex arc-shaped region of the second reflection region.

The present invention further provides a backlight source, which includes above-described back cover and a light emitting diode (LED) light. The LED light is arranged adjacent to one side of the back cover.

In the above backlight source, the LED light is arranged adjacent to the first reflection region of the reflection surface.

The present invention further provides a display apparatus having above-described backlight source.

The above aspects of the present invention provide the following advantages.

In the present invention, a light guide plate of a backlight source is substituted by the back cover. The reflection surface, which includes a plurality of concave arc-shaped regions arranged on the back cover, reflects light to the display panel. Since the reflection surface includes concave arc-shaped regions, whose curvatures increase first and then decrease, the light emitted from the light source and reflected on the reflection surface is distributed uniformly on the display panel. The display apparatus according to the present embodiment uses the back cover instead of the light guide plate thereby substantially reducing the manufacturing cost.

DETAILED DESCRIPTION OF THE PREFERRED EMBODIMENTS

Hereafter, embodiments will be detailed with reference to the accompanying drawings to make the technical issue, technical solutions and advantages of the present invention become more apparent.

Figure 1:
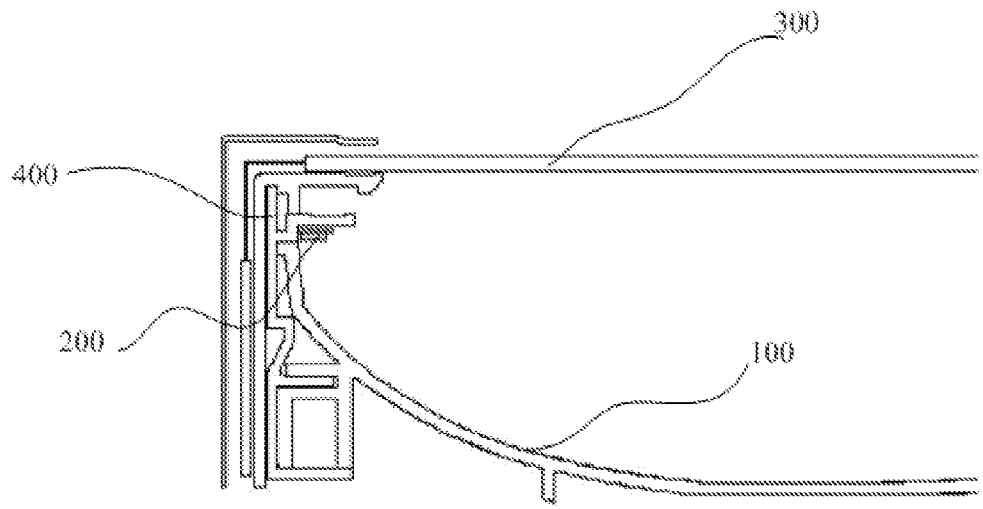
FIG. 1 is a schematic view showing a configuration of a display apparatus according to an embodiment of the present invention.

FIG. 1 is a schematic view showing a display apparatus according to an embodiment of the present invention. The display apparatus includes a back cover, a light source 200, and a display panel 300. The light source 200 is arranged adjacent to one side of the back cover. The back cover includes at least a reflection surface 100 arranged on one surface of the back cover facing the light source 200. The reflection surface includes a first reflection region and a second reflection region. Each of the first reflection region and the second reflection region includes a plurality of concave arc-shaped regions. Curvatures of the concave arc-shaped regions included in the first reflection region increase in a direction toward the second reflection region. Curvatures of the concave arc-shaped regions included in the second reflection region decrease in a direction away from the first reflection region. The concave arc-shaped region, which has a maximum curvature in the first reflection region, is connected with the concave arc-shaped region, which has a maximum curvature in the second reflection region. In the present embodiment, the back cover is used instead of a light guide plate for guiding light emitted from a backlight source. As described above, the back cover includes the reflection surface 100 having a plurality of concave arc-shaped regions. Thus, light emitted from the light source 200 is reflected on the reflection surface 100 of the back cover, and then is guided to the display panel 300. The reflection surface includes a plurality of concave arc-shaped regions and the curvatures of the concave arc-shaped regions increase first, and then decrease. Thus, the light is uniformly distributed on the display panel 300 after being reflected on the concave arc-shaped regions. The display apparatus according to the present invention uses the back cover instead of the light guide plate. Thus, a manufacturing cost of the display apparatus is reduced.

The light source 200 in the present invention may be provided by any type of light source, such as a light emitting diode (LED) light. The back cover may be made from polycarbonate, Acrylonitrile Butadiene Styrene (ABS) resin, or a polymer of the polycarbonate and the ABS resin. The back cover may be formed by an injection molding method or other molding methods. A thickness of the back cover may be set according to a design requirement. The back cover in the present embodiment has a thickness of 1 millimeter (mm) to 3 mm. The reflection surface 100 is attached on one surface of the back cover.

In order to strengthen heat dissipation effect, the LED light is equipped to an aluminum base 400. The base 400 may have any appropriate shape, such as a strip shape. The base 400 may be made of aluminum material so that heat generated by the LED light is dissipated quickly thereby decreasing a temperature of the LED light and avoid the temperature being too high. The display apparatus may include one LED light or a plurality of LED lights. FIG. 1 shows an example in which one LED light is arranged adjacent to one side of the back cover. Further, the display apparatus may have another LED light arranged adjacent to the other side of the back cover so that a brightness of the light is increased. When the LED lights are arranged at both sides of the back cover, the LED lights configure a double-side-emitting backlight source. When the LED lights are arranged at both sides of the back cover, the light emitted from the LED lights is reflected on the arc-shaped reflection surface of the back cover, and then enters the display panel. Thus, the light guide plate is not necessary in this structure. Accordingly, necessary cost for the light guide plate is reduced, and yield rate is increased.

Figure 2:
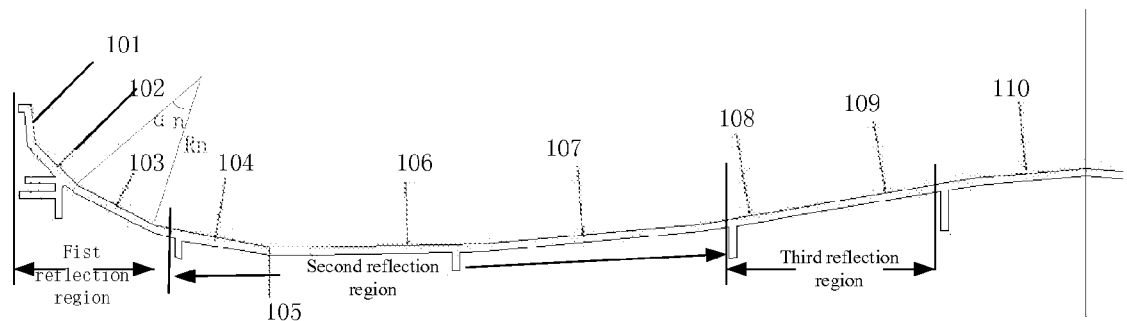
FIG. 2 is a schematic view showing a configuration of a back cover according to an embodiment of the present invention.

FIG. 2 shows a configuration of the back cover according to an embodiment of the present invention. The back cover includes the reflection surface 100, which is attached on one surface of the back cover. The reflection surface includes a plurality of concave arc-shaped regions. As shown in FIG. 2, in the present embodiment, the reflection surface includes nine concave arc-shaped regions and a convex arc-shaped region. Specifically, the reflection surface includes a first concave arc-shaped region 101, a second concave arc-shaped region 102, a third concave arc-shaped region 103, a fourth concave arc-shaped region 104, a fifth concave arc-shaped region 105, a sixth concave arc-shaped region 106, a seventh concave arc-shaped region 107, an eighth concave arc-shaped region 108, a ninth concave arc-shaped region 109, and the convex arc-shaped region 110.

The first reflection region includes the first concave arc-shaped region 101, the second concave arc-shaped region 102, and the third concave arc-shaped region 103. The curvatures of the first to third concave arc-shaped regions 101 to 103 increase in a direction toward the second reflection region. Specifically, the curvature of the third concave arc-shaped region 103 is larger than the curvature of the second concave arc-shaped region 102, and the curvature of the second concave arc-shaped region 102 is larger than the curvature of the first concave arc-shaped region 101. In the present embodiment, the first concave arc-shaped region 101 has the curvature K1 within a range of 0.004 to 0.007 mm$^{-1}$, the second concave arc-shaped region 102 has the curvature K2 within a range of 0.008 to 0.011 mm$^{-1}$, and the third concave arc-shaped region 103 has the curvature K3 within a range of 0.03 to 0.06 mm$^{-1}$.

The second reflection region includes the fourth concave arc-shaped region 104, the fifth concave arc-shaped region 105, the sixth concave arc-shaped region 106, and the seventh concave arc-shaped region 107. The fourth concave arc-shaped region 104 of the second reflection region is connected with the third concave arc-shaped region 103 of the first reflection region. The curvatures of the fourth to seventh concave arc-shaped regions 104 to 107 decrease in the direction away from the first reflection region. In the present embodiment, the fourth concave arc-shaped region 104 has the curvature K4 within a range of 0.008 to 0.01 mm$^{-1}$, the fifth concave arc-shaped region 105 has the curvature K5 within a range of 0.005 to 0.007 mm$^{-1}$, the sixth concave arc-shaped region 106 has the curvature K6 within a range of 0.002 to 0.004 mm$^{-1}$, and the seventh concave arc-shaped region 107 has the curvature K7 within a range of 0.0006 to 0.001 mm$^{-1}$. The fourth concave arc-shaped region 104 to the seventh concave arc-shaped region 107 configure the second reflection region of the reflection surface 100, and the curvatures of the concave arc-shaped regions of the second reflection region decrease in the direction away from the first reflection region.

As shown in FIG. 2, in the present embodiment, the reflection surface 100 of the back cover further includes a third reflection region. The third reflection region includes the eighth concave arc-shaped region 108 and the ninth concave arc-shaped region 109. The eighth concave arc-shaped region 108 of the third reflection region is connected with the seventh concave arc-shaped region 107 of the second reflection region. In the present embodiment, the eighth concave arc-shaped region has the curvature K8 within a range of 0.001 to 0.004 $mm^{-1}$, and the ninth concave arc-shaped region has the curvature K9 within a range of 0.001 to 0.003 $mm^{-1}$. In the present invention, the light emitted from the light source 200 is uniformly reflected on the reflection surface 100 by appropriately setting the curvatures of the nine concave arc-shaped regions 101 to 109. Thus, the light entering the display panel 300 is uniformly distributed on the display panel 300.

In the present invention, the curvature of each concave arc-shaped region may be a constant value or a variable value. When the curvature of each concave arc-shaped region is the constant value, each concave arc-shaped region is a part of a circumference and the curvature may be selected from the above-described corresponding curvature range. A width of each concave arc-shaped region may be set as the following in order to improve a reflection effect of the reflection surface 100. The first concave arc-shaped region 101 may have a central angle $\alpha 1$ within a range of 2 to 4 degrees, the second concave arc-shaped region 102 may have a central angle $\alpha 2$ within a range of 5 to 8 degrees, the third concave arc-shaped region 103 may have a central angle $\alpha 3$ within a range of 7 to 9 degrees, the fourth concave arc-shaped region 104 may have a central angle $\alpha 4$ within a range of 8 to 11 degrees, the fifth concave arc-shaped region 105 may have a central angle $\alpha 5$ within a range of 3 to 5 degrees, the sixth concave arc-shaped region 106 may have a central angle $\alpha 6$ within a range of 3 to 6 degrees, the seventh concave arc-shaped region 107 may have a central angle $\alpha 7$ within a range of 2 to 4 degrees, the eighth concave arc-shaped region 108 may have a central angle $\alpha 8$ within a range of 2 to 4 degrees, and the ninth concave arc-shaped region 109 may have a central angle $\alpha 9$ within a range of 1 to 3 degrees.

When each of the concave arc-shaped regions is a part of the circumference, each of the concave arc-shaped regions may also be expressed by a radius of a circle corresponding to the circumference. For example, a circle corresponding to the first concave arc-shaped region 101 may have a radius R1 within a range of 160 to 180 mm, a circle corresponding to the second concave arc-shaped region 102 may have a radius R2 within a range of 110 to 130 mm, a circle corresponding to the third concave arc-shaped region 103 may have a radius R3 within a range of 20 to 25 mm, a circle corresponding to the fourth concave arc-shaped region 104 may have a radius R4 within a range of 110 to 120 mm, a circle corresponding to the fifth concave arc-shaped region 105 may have a radius R5 within a range of 160 to 180 mm, a circle corresponding to the sixth concave arc-shaped region 106 may have a radius R6 within a range of 310 to 330 mm, a circle corresponding to the seventh concave arc-shaped region 107 may have a radius R7 within a range of 1150 to 1200 mm, a circle corresponding to the eighth concave arc-shaped region 108 may have a radius R8 within a range of 500 to 520 mm, and a circle corresponding to the ninth concave arc-shaped region 109 may have a radius R9 within a range of 690 to 710 mm.

The reflection surface 100 further includes the convex arc-shaped region 110 so that the light is uniformly distributed on the display panel 300 when a plurality of the reflection surface 100 are connected. The convex arc-shaped region 110 is connected with the ninth concave arc-shaped region 109 of the third reflection region. When the back cover includes a plurality of reflection surfaces 100, a boundary of adjacent two reflection surfaces has a corner. The corner disturbs the light reflected on the reflection surfaces 100 to be uniformly distributed on the display panel 300. When the boundary of two adjacent concave arc-shaped regions is joined via the convex arc-shaped region 110, the boundary does not have the corner. Preferably, the convex arc-shaped region 110 may have a curvature K10 within a range of 0.004 to 0.007 $mm^{-1}$, a central angle $\alpha 10$ within a range of 4 to 7 degrees. And a circle corresponding to the convex arc-shaped region 110 may have a radius R10 within a range of 175 to 195 mm, when the convex arc-shaped region is a part of the circumference. The radius R1-R10 and the central angles $\alpha 1$-central angle $\alpha 10$ are indicated with Rn and $\alpha n$ in FIG. 2, respectively, where n is an integer greater than or equal to 1.

The following will describe another embodiment of the present invention. In the present embodiment, the back cover includes a first reflection surface and a second reflection surface, which are which are axial-symmetrically arranged. Each of the first reflection surface and the second reflection surface includes a first reflection region, a second reflection region, and a third reflection region. Each of the first reflection region, the second reflection region, and the third reflection region includes a plurality of concave arc-shaped regions. Curvatures of the concave arc-shaped regions in the first reflection region increase in a direction toward the second reflection region, and curvatures of the concave arc-shaped regions in the second reflection region decrease in the direction away from the first reflection region. The concave arc-shaped region having a maximum curvature in the first reflection region is connected with the concave arc-shaped region having a maximum curvature in the second reflection region. Each of the first reflection surface and the second reflection surface includes a convex arc-shaped region. The convex arc-shaped region of the first reflection surface is connected with the convex arc-shaped region of the second reflection surface. The two convex arc-shaped regions that are connected with each other increase a brightness of the display panel 300 at a center portion, and increase uniformity and quality of the display panel 300. As shown in FIG. 2, when the first reflection surface includes nine concave arc-shaped regions and one convex arc-shaped region, a symmetry axis is arranged at one end side of the convex arc-shaped region which is away from the ninth concave arc-shaped region. When the first reflection surface is arranged at one side of the symmetry axis, the second reflection surface is arranged on the other side of the symmetry axis. Thus, in the present embodiment, the back cover includes twenty arc-shaped regions. The light reflected on the reflection surfaces and guided to the display panel 300 is uniformly distributed by adjusting the curvatures of the twenty arc-shaped regions.

The present invention further provides a back light source. The back light source includes the back cover and the light source 200 arranged adjacent to one side of the back cover. The light source may be provided by the LED light. The back cover according to the present embodiment includes at least one reflection surface, which is arranged on one surface of the back cover facing the light source 200. The reflection surface includes the first reflection region and the second reflection region. Each of the first reflection region and the second reflection region includes a plurality of concave arc-shaped regions. The curvatures of the concave arc-shaped regions included in the first reflection region increase in a direction toward the second reflection region. The curvatures of the concave arc-shaped regions included in the second reflection region decrease in the direction away from the first reflection region. The concave arc-shaped region having the maximum curvature in the first reflection region is connected with the concave arc-shaped region having the maximum curvature in the second reflection region. The LED light is arranged adjacent to the first reflection region. In this configuration, curvature of the first reflection region is relatively large. Accordingly, an incident light on the first reflection region has a relatively large inclination angle toward an upward direction. Thus, the light guided to the display panel 300 is uniformly distributed more easily. When the back cover includes the symmetric two reflection surfaces, a first LED light is arranged adjacent to the first reflection region of the first reflection surface, and a second LED light is arranged adjacent to the first reflection region of the second reflection surface.

Figure 3:
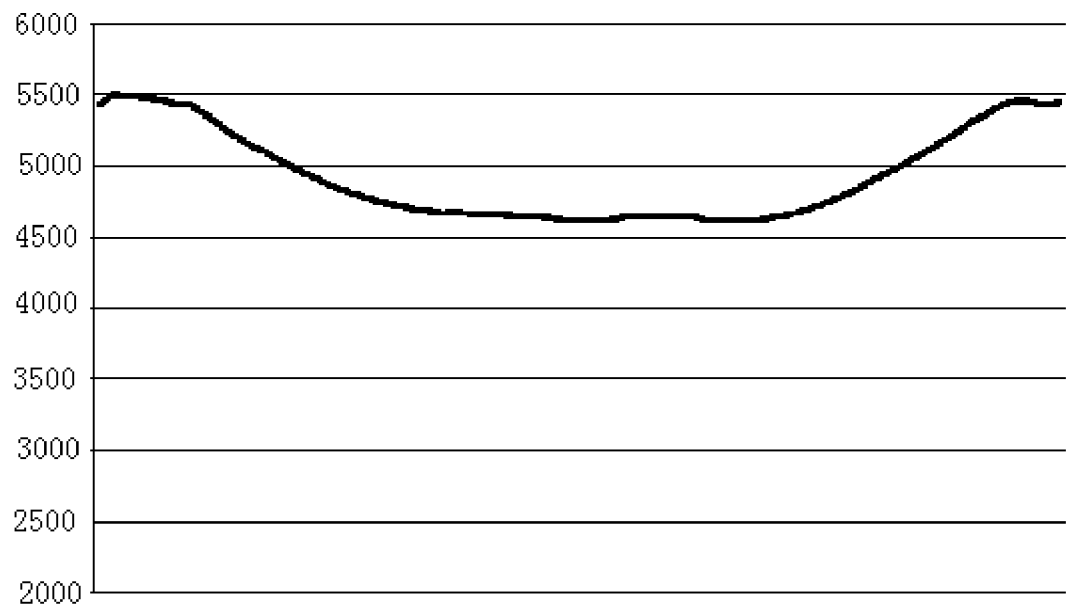
FIG. 3 is a brightness distribution graph at a central distribution line showing a test result of a backlight source according to an embodiment of the present invention.
Figure 4:
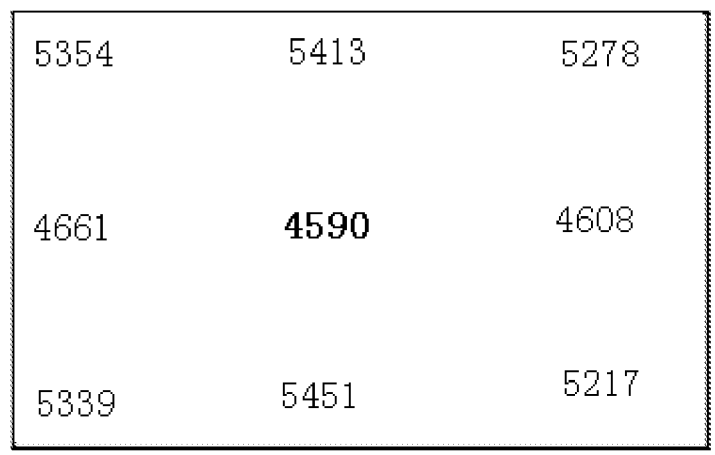
FIG. 4 is a 9-point brightness distribution graph showing a test result of a backlight source according to an embodiment of the present invention.

The back cover according to the present invention may be applied to display apparatuses having various sizes. When the back cover according to the present embodiment is tested on a display apparatus having a size of 32 inches, an average brightness of the backlight source is up to 5000 nits or greater. The uniformity of the 9-point brightness distribution graph is 80% or greater. FIG. 3 is a brightness distribution graph at a central distribution line showing a test result of a backlight source according to an embodiment of the present invention. As shown in FIG. 3, the brightness measured on a central distribution line is relatively uniform, and an average brightness is 5000 nits. FIG. 4 is a 9-point brightness distribution graph showing a test result of a backlight source according to an embodiment of the present invention. As shown in FIG. 4, a brightness uniformity at nine points is 80% or greater. As seen from above test result of a backlight source sample, the backlight source provides an improved optical effect, and a cost of the backlight source is substantially reduced compared with a conventional backlight source. Thus, the backlight source according to the present embodiment is competitive in a market, and may be used broadly.

In the above-described technical solution, the light guide plate used in the backlight source is substituted by the back cover. The reflection surface, which includes a plurality of concave arc-shaped regions arranged on one surface of the back cover, reflects the light to the display panel. Since the reflection surface includes a plurality of concave arc-shaped regions, whose curvatures increase first and then decrease, the light emitted from the light source and reflected on the reflection surface is distributed uniformly on the display panel. The display apparatus according to the present embodiment uses the back cover instead of the light guide plate thereby substantially reducing the manufacturing cost.

The preferable embodiments according to the present invention have been described. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A back cover for a backlight source, comprising:
at least one reflection surface arranged on one surface of the back cover, wherein:
the reflection surface includes a first reflection region and a second reflection region;

the first reflection region includes a plurality of concave arc-shaped regions whose curvatures gradually increase in a direction toward the second reflection region;

the second reflection region includes a plurality of concave arc-shaped regions whose curvatures gradually decrease in a direction away from the first reflection region; and the concave arc-shaped region having a maximum curvature in the first reflection region is connected with the concave arc-shaped region having a maximum curvature in the second reflection region.

2. The back cover according to claim 1, wherein:
the first reflection region includes a first concave arc-shaped region having a curvature within a range of 0.004 to 0.007 $mm^{-1}$, a second concave arc-shaped region having a curvature within a range of 0.008 to 0.011 $mm^{-1}$, and a third concave arc-shaped region having a curvature within a range of 0.03 to 0.06 $mm^{-1}$; and the second reflection region includes a fourth concave arc-shaped region having a curvature within a range of 0.008 to 0.01 $mm^{-1}$, a fifth concave arc-shaped region having a curvature within a range of 0.005 to 0.007 $mm^{-1}$, a sixth concave arc-shaped region having a curvature within a range of 0.002 to 0.004 $mm^{-1}$, and a seventh concave arc-shaped region having a curvature within a range of 0.0006 to 0.001 $mm^{-1}$.

3. The back cover according to claim 2, wherein:
the first concave arc-shaped region has a central angle $\alpha 1$ within a range of 2 to 4 degrees;

the second concave arc-shaped region has a central angle $\alpha 2$ within a range of 5 to 8 degrees;

the third concave arc-shaped region has a central angle $\alpha 3$ within a range of 7 to 9 degrees;

the fourth concave arc-shaped region has a central angle $\alpha 4$ within a range of 8 to 11 degrees;

the fifth concave arc-shaped region has a central angle $\alpha 5$ within a range of 3 to 5 degrees;

the sixth concave arc-shaped region has a central angle $\alpha 6$ within a range of 3 to 6 degrees; and the seventh concave arc-shaped region has a central angle $\alpha 7$ within a range of 2 to 4 degrees.

4. The back cover according to claim 3, wherein:
the reflection surface further includes a third reflection region;

the third reflection region includes an eighth concave arc-shaped region having a curvature within a range of 0.001 to 0.004 $mm^{-1}$ and a ninth concave arc-shaped region having a curvature within a range of 0.001 to 0.003 $mm^{-1}$; and the eighth concave arc-shaped region is connected with the seventh concave arc-shaped region.

5. The back cover according to claim 4, wherein:
the eighth concave arc-shaped region has a central angle $\alpha 8$ within a range of 2 to 4 degrees; and the ninth concave arc-shaped region has a central angle $\alpha 9$ within a range of 1 to 3 degrees.

6. The back cover according to claim 4, wherein:
the reflection surface further includes a convex arc-shaped region;

the convex arc-shaped region is connected with the ninth concave arc-shaped region; and the convex arc-shaped region has a curvature within a range of 0.004 to 0.007 $mm^{-1}$ and a central range $\alpha 10$ within a range of 4 to 7 degrees.

7. The back cover according to claim 6, wherein:
the back plate includes two pieces of the reflection surface which are axial-symmetrically arranged and referred to as a first reflection surface and a second reflection surface respectively.

8. The back cover according to claim 7, wherein;
the convex arc-shaped region of the first reflection region is connected with the convex arc-shaped region of the second reflection region.

9. A backlight source, comprising:
the back cover according to claim 1; and
a light emitting diode (LED) light arranged adjacent to one side of the back cover.

10. The backlight source according to claim 9, wherein
the LED light is arranged adjacent to the first reflection region of the reflection surface.

11. The backlight source according to claim 9, wherein
the first reflection region includes a first concave arc-shaped region having a curvature within a range of 0.004 to 0.007 $mm^{-1}$, a second concave arc-shaped region having a curvature within a range of 0.008 to 0.011 $mm^{-1}$, and a third concave arc-shaped region having a curvature within a range of 0.03 to 0.06 $mm^{-1}$; and
the second reflection region includes a fourth concave arc-shaped region having a curvature within a range of 0.008 to 0.01 $mm^{-1}$, a fifth concave arc-shaped region having a curvature within a range of 0.005 to 0.007 $mm^{-1}$, a sixth concave arc-shaped region having a curvature within a range of 0.002 to 0.004 $mm^{-1}$, and a seventh concave arc-shaped region having a curvature within a range of 0.0006 to 0.001 $mm^{-1}$.

12. The backlight source according to claim 11, wherein
the first concave arc-shaped region has a central angle $\alpha 1$ within a range of 2 to 4 degrees;
the second concave arc-shaped region has a central angle $\alpha 2$ within a range of 5 to 8 degrees;
the third concave arc-shaped region has a central angle $\alpha 3$ within a range of 7 to 9 degrees;
the fourth concave arc-shaped region has a central angle $\alpha 4$ within a range of 8 to 11 degrees;
the fifth concave arc-shaped region has a central angle $\alpha 5$ within a range of 3 to 5 degrees;
the sixth concave arc-shaped region has a central angle $\alpha 6$ within a range of 3 to 6 degrees; and
the seventh concave arc-shaped region has a central angle $\alpha 7$ within a range of 2 to 4 degrees.

13. The backlight source according to claim 12, wherein
the reflection surface further includes a third reflection region;
the third reflection region includes an eighth concave arc-shaped region having a curvature within a range of 0.001 to 0.004 $mm^{-1}$ and a ninth concave arc-shaped region having a curvature within a range of 0.001 to 0.003 $mm^{-1}$; and
the eighth concave arc-shaped region is connected with the seventh concave arc-shaped region.

14. The backlight source according to claim 13, wherein
the eighth concave arc-shaped region has a central angle $\alpha 8$ within a range of 2 to 4 degrees; and
the ninth concave arc-shaped region has a central angle $\alpha 9$ within a range of 1 to 3 degrees.

15. The backlight source according to claim 13, wherein
the reflection surface further includes a convex arc-shaped region;
the convex arc-shaped region is connected with the ninth concave arc-shaped region; and
the convex arc-shaped region has a curvature within a range of 0.004 to 0.007 $mm^{-1}$ and a central range $\alpha 10$ within a range of 4 to 7 degrees.

16. The backlight source according to claim 15, wherein
the back plate includes two pieces of the reflection surface which are axial-symmetrically arranged and referred to as a first reflection surface and a second reflection surface respectively.

17. The backlight source according to claim 16, wherein
the convex arc-shaped region of the first reflection region is connected with the convex arc-shaped region of the second reflection region.

18. A display apparatus, comprising
the backlight source according to claim 10.

19. A display apparatus, comprising a display panel, a back cover and a light source; wherein the back cover comprises at least one reflection surface facing the display panel;
the reflection surface comprises a first reflection region and a second reflection region adjoining the first reflection region;
the first reflection region comprises a plurality of concave arc-shaped regions whose radius of curvature gradually decrease in a direction toward the second reflection region;
the second reflection region comprises a plurality of concave arc-shaped regions whose radius of curvature gradually increase in a direction away from the first reflection region; and
the concave arc-shaped region having a minimum radius of curvature in the first reflection region is connected with the concave arc-shaped region having a minimum radius of curvature in the second reflection region;
wherein the display apparatus further comprises an extension portion located between the back cover and the display panel; the extension portion extends inward from an edge of the back cover and is parallel to the display panel; the extension portion has a first surface facing the display panel, and an opposite second surface facing the back cover;
the light source is on the second surface and faces the back cover.

20. The display apparatus according to claim 19, wherein
the first reflection region includes a first concave arc-shaped region having a radius of curvature within a range of 160 to 180 mm, a second concave arc-shaped region having a radius of curvature within a range of 110 to 130 mm, and a third concave arc-shaped region having a radius of curvature within a range of 20 to 25 mm; and
the second reflection region includes a fourth concave arc-shaped region having a radius of curvature within a range of 110 to 120 mm, a fifth concave arc-shaped region having a radius of curvature within a range of 160 to 180 mm, a sixth concave arc-shaped region having a radius of curvature within a range of 310 to 330 mm, and a seventh concave arc-shaped region having a radius of curvature within a range of 1150 to 1200 mm.

* * * * *